United States Patent Office 3,433,016
Patented Mar. 18, 1969

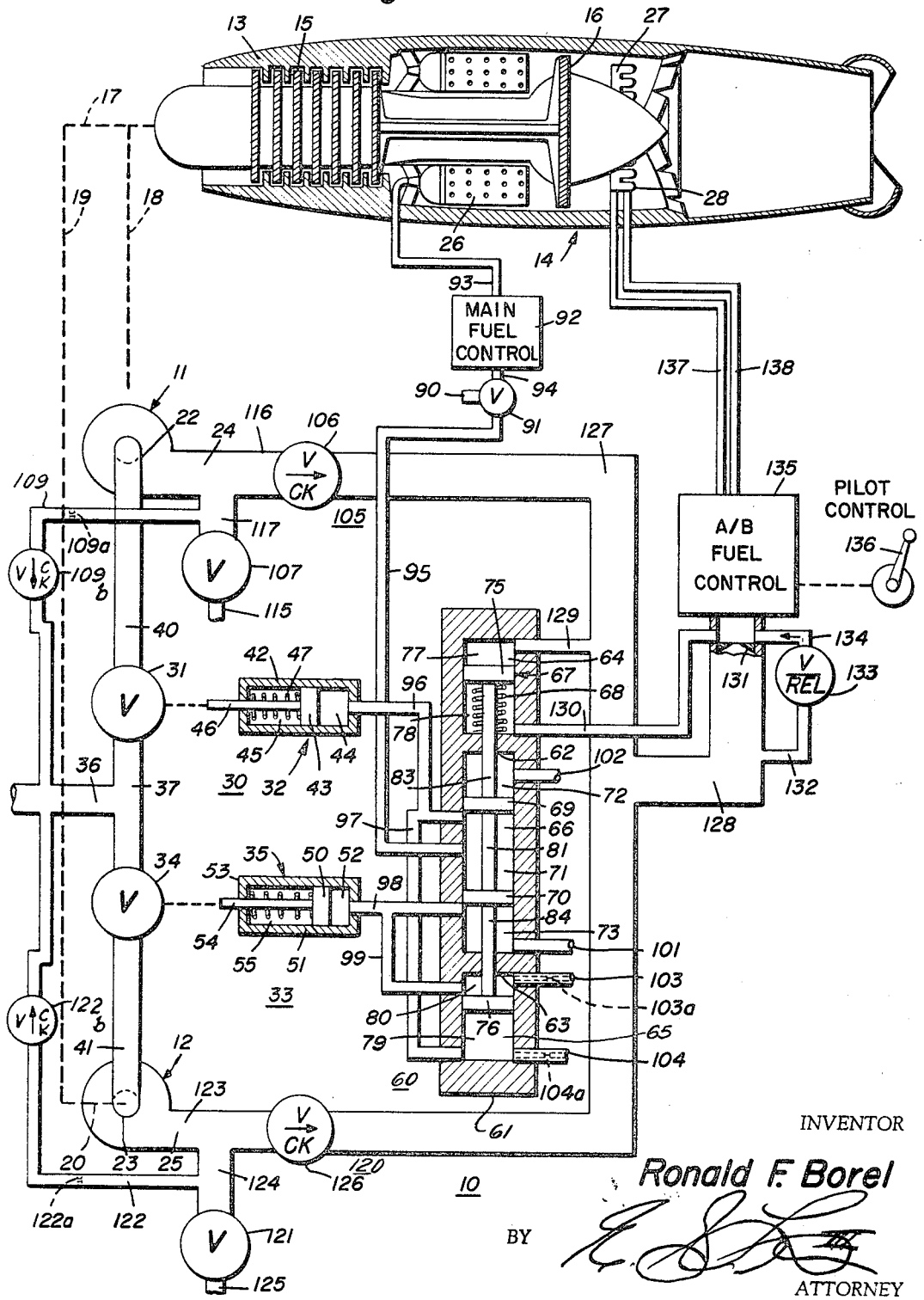

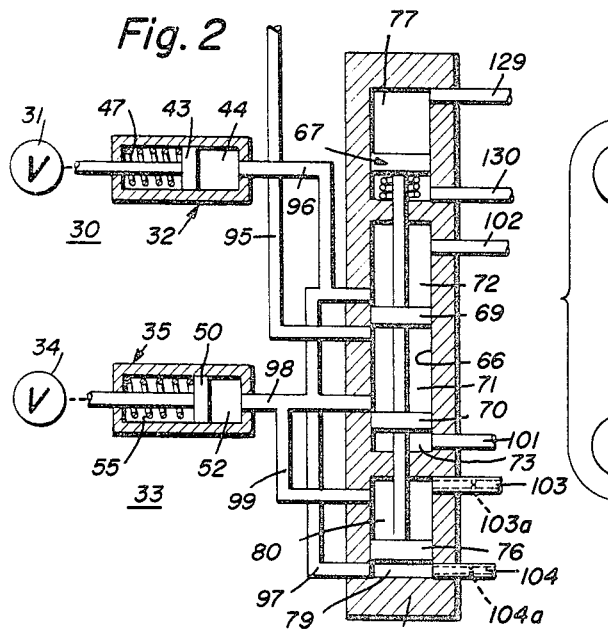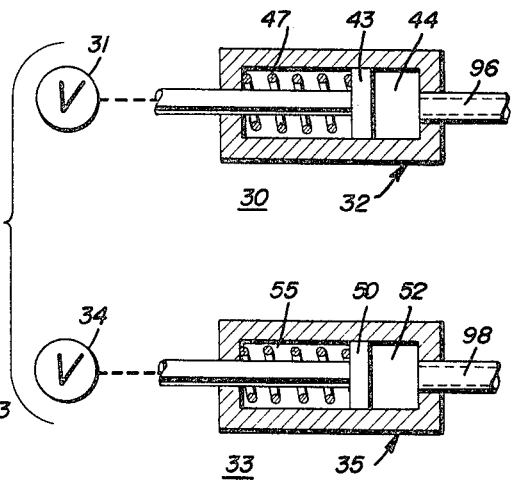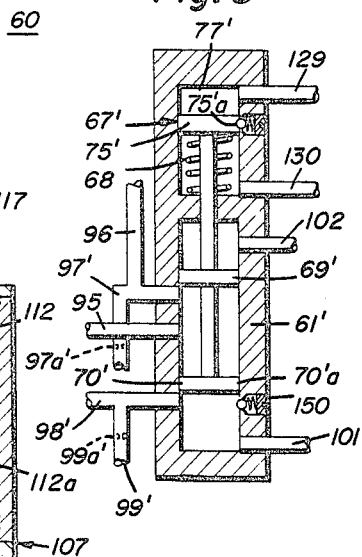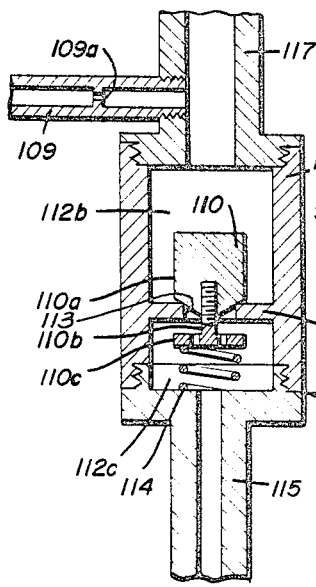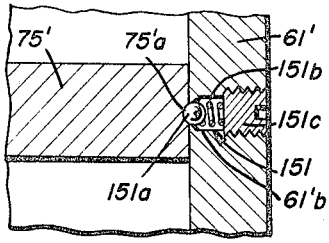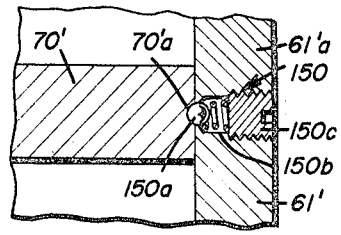

3,433,016
FUEL DELIVERY SYSTEM
Ronald F. Borel, Cincinnati, Ohio, assignor to General Electric Company, a corporation of New York
Filed Mar. 9, 1967, Ser. No. 621,925
U.S. Cl. 60—39.28      10 Claims
Int. Cl. F02c 7/22; F02k 3/10; F04b 49/00

ABSTRACT OF THE DISCLOSURE

A fuel delivery system for the afterburner of a gas turbine engine, which comprises first and second centrifugal pumps respectively having a small and a large capacity. The pumps are mechanically driven from the rotor of the gas turbine engine. On-off valves are respectively provided in the inlet connection of each pump to a fuel supply. When the gas turbine engine reaches a predetermined speed, a pressure signal is fed to a selector valve which directs the pressure signal to an actuator for opening the inlet valve of the low capacity pump to direct fuel to a control unit which meters it to the afterburner. When afterburner flow exceeds a given level, the selector valve removes the pressure signal from the first actuator and directs it to a second actuator, thereby causing the first pump inlet valve to close and the second pump inlet valve to open, whereby larger fuel flow demands are satisfied by the second pump. Check valves prevent reverse flow of fuel through the pumps and drain valves are provided for automatically draining fuel from the pumps when they are not delivering fuel.

Background of the invention

The present invention, accordingly, relates to improvements in fuel delivery systems and, more particularly, to improvements in fuel delivery systems for the afterburners of gas turbine engines.

Afterburner fuel requirements impose serious problems in pump design due to the large operating range in discharge flows. With advanced engine designs a maximum to minimum flow ratio of 100:1 up to 200:1 or higher may be needed in order to satisfy minimum flow requirements at high altitudes and maximum flow requirements at low altitudes. In the pumping of fluids, such as fuel for the latter purpose, problems because of temperature being increased excessively in the system can arise if a pump having a large enough capacity for the maximum flow demand to be satisfied is called upon to operate on quite low flow demand. Then, too, there are on occasions systems in the category of applications which require a pump having a large range of discharge flows with substantially high pressures at low flow levels. Further, it is desirable for the sake of simplicity and reliability to employ centrifugal pumps which are directly coupled to the engine rotor and therefore driven continuously.

An object of the invention is to provide an improved fuel delivery system particularly meeting the wide flow range requirements of a gas turbine engine afterburner.

In accordance with the present invention, first and second centrifugal pump means respectively of relatively small capacity to satisfy a range of decreased flow requirements and a range of increased flow requirements are arranged for their rotors to be driven to rotate in unison. The first and second centrifugal pump means have their inlets connected with multiple on-off valve means constructed for controlledly being in an off position closed to these inlets and to take pressure responsively, a first on-off position open to the inlet of the first centrifugal pump means and closed to the inlet of the second centrifugal pump means, and a second on-off position closed to the inlet of the first centrifugal pump means and open to the inlet of the second centrifugal pump means. Also within the control structure of the system, fluid pressure responsive selector valve means having first and second conductive positions selectively is provided and is connected with the multiple on-off valve means and with a controllable supply of pressurized control fluid for the multiple on-off valve means to occupy the off position and selectively the first on-off position in response to pressure of a control fluid while the fluid pressure responsive selector valve means is in the first conductive position and the second on-off position in response to pressure of a control fluid while the fluid pressure responsive selector valve means is in the second conductive position. There is a function generator connected with the outlet of each of the first and second centrifugal pump means and generating a pressure varying directly with the mass flow from either the outlet of the first centrifugal pump means or from the outlet of the second centrifugal pump means, as the case may be, and the fluid pressure responsive selector valve means is in communication with the function generator means fluid pressure responsively to move from the first conductive position to the second conductive position when fluid pressure varying directly with the mass flow of fluid from the outlet of the first centrifugal pump means attains an upper value and move from the second conductive position to the first conductive position when fluid pressure varying directly with the mass flow of fluid from the outlet of the second centrifugal pump means attains a value less than the aforementioned upper value. The system therefore is well suited to select effective pumping operation of the first centrifugal pump means to satisfy a range of decreased output flow requirements or effective pumping operation of the second centrifugal pump means to satisfy a range of increased output flow requirements, and the first and second centrifugal pump means therefore share in imparting a maximum flow to minimum output flow ratio which is satisfactorily high for the requirements of an afterburner of a gas turbine engine.

Identification of drawings

While the specification concludes with claims particularly pointing out and distinctly claiming the subject matter which I regard as my invention, it is believed that the invention will be better understood from the following description with reference to the illustrative embodiments thereof represented in drawings herewith in which:

FIGURE 1 is a diagram representing a fluid pumping system in affiliation with a jet aircraft engine and further denotes a first conductive position of selector valve means and corresponding on and off positions of a multiple on-off valve means relative to the inlets of first and second centrifugal pump means respectively;

FIGURE 2 corresponds to FIGURE 1 and denotes second conductive position of the selector valve means and related on-off positions of the multiple on-off valve means relative to the inlets of the first and second centrifugal pump means respectively;

FIGURE 3 corresponds to FIGURES 1 and 2 and designates a selected off position of the multiple on-off valve means relative to the inlets of the first and second centrifugal pump means, having the selector valve means in the first conductive position;

FIGURE 4 represents a drain valve and vent detail corresponding to FIGURE 1;

FIGURE 5 is a detail view of selector valve means having modified detent features; and FIGURES 6 and 7 are mechanical latch details of the selector valve means of FIGURE 5.

Referring now more particularly to FIGURE 1 of the accompanying drawings, it will be understood that the particular system 10 for supplying fluid on variable output flow requirement comprises a first centrifugal pump 11 having a relatively small capacity and a second centrifugal pump 12 having a relatively large capacity, respectively to satisfy decreased and increased output flow demands on selected pumping action. For purposes of illustration of one of many possible uses, system 10 is shown with a jet aircraft engine 14 wherein the interconnected compressor rotor 15 and turbine rotor 16 are mounted to rotate unitarily within the engine casing 13. As represented by the gang lines 17, 18, 19 and 20 in FIGURE 1 the rotors of the centrifugal pumps are ganged rotatably with the engine rotors 15 and 16 to be driven on operation of the engine 14 and have the rotors of both of these pumps rotate concurrently in a direction favoring discharge of fluid from the outlets 24 and 25 of the pumps.

Multiple on-off pump inlet control valve means in the system 10 includes both a fluid pressure responsive first on-off valve means 30 wherein a first on-off valve 31 has a fluid pressure responsive actuator 32, and a fluid pressure responsive second on-off valve means 33 wherein there is a second on-off valve 34 and a fluid pressure responsive actuator 35. A fluid input header duct 37 is connected with the inlets of the on-off valves 31 and 34 and is in communication with a supply duct 36 fed from a suitable source of fluid fuel supply not shown. The on-off valves 31 and 34 have output ducts 40 and 41 respectively in fluid feed connection with the inlets 22 and 23 of the centrifugal pumps for fluid to be taken in centrally of the related pump chamber and be discharged through the outlet 24 or 25 as the case may be.

The fluid pressure responsive actuator 32 includes a cylinder 42 wherein a piston 43 is arranged to move slidably while partitioning off the interior of this cylinder into compartments 44 and 45. A rod 46 of the piston extends through the compartment 45 and slidably through the adjacent end of the cylinder 42 and has a positioning drive connection with the on-off valve 31. A helical biasing spring 47 surrounding the piston rod 46 has opposite end portions pressing against the end face of the cylinder and against a corresponding end face of the piston which are within the compartment 45. Spring 47 is arranged with the on-off valve 31 to bias the latter valve to close the ducts 37 and 40 and accordingly to inlet 22 of the centrifugal pump 11. The piston 43 moreover is capable of responding to pressure of fluid when pressurized control fluid is admitted to compartment 44 in a manner hereinafter to be described, for opening the on-off valve 31 against the bias of spring 47. Similarly, the fluid pressure responsive actuator 35 is arranged having a slidably movable piston 50 partitioning off the interior of cylinder 51 into compartments 52 and 53 and coupled by the piston rod 54 with the on-off valve 34. Rod 54 is surrounded by a helical spring 55 within the compartment 53. The rod extends slidably through an end wall of the cylinder 51 and is connected with the on-off valve 34 for this valve to be opened and closed with reference to ducts 37 and 41 and accordingly with reference to inlet 23 of the centrifugal pump 12. Spring 55 bears against the end of cylinder 51 through which the rod extends and against the end face of piston 50 within the compartment 53 compressionally to bias the on-off valve 34 to closed position and for the piston 50 to respond to pressure in compartment 52 to have the actuator 35 open the on-off valve 34 against the bias of spring 55. Both the compartment 55 of actuator 35 and the compartment 45 of the actuator 32 are relieved in any suitable manner, not shown, for the related pistons 43 and 50 to move freely against the bias of their springs when either or both of the valves 31 and 34 are being opened.

A fluid pressure responsive selector valve means 60 in the system 10 includes a plural compartment casing 61 wherein a pair of spaced walls 62 and 63 partition the interior of the casing into two end chambers 64 and 65 and an intermediate chamber 66. Further, the fluid pressure responsive selector valve means includes a movable valve member 67 and a helical biasing spring 68. Movable valve member 67 has two spaced intermediate lands 69 and 70 within the intermediate chamber 66 and these lands partition this chamber into an intermediate compartment 71 and opposite end compartments 72 and 73. Opposite end lands 75 and 76 are respectively in chambers 64 and 65 and partition these chambers into outer compartments 77 and 79 and inner compartments 78 and 80. The intermediate lands 69 and 70 are joined by means of a reduced axial portion 81 of the movable valve member 67 within the compartment 71, and there are reduced axial portions 83 and 84 of this same movable valve member which join respectively the lands 75 and 76 with the lands 69 and 70 and extend slidably through the partition walls 62 and 63 for the movable valve member to be axially moved in each of opposite directions slidably. The lands 69, 70, 75 and 76 may be peripherally sealed slidably to the inner face of the casing 61 and the reduced portion 83 and 84 may be peripherally sealed slidably to the partitions 62 and 63, in any suitable manner. The helical spring 68 surrounds the reduced portion 83 within the compartment 78 and bears compressionally at opposite end portions against the face of the land 75 and the face of wall 62 which are inside this compartment. Accordingly, the fluid pressure responsive selector valve means 60 may seek a first conductive position which is represented in FIGURE 1, having the movable valve member 67 lifted upward and position controlled by the spring 68 to the position viewed in the latter figure.

A pressurized control fluid suitably provided in a manner not shown is available in supply line 90 which leads into a control valve 91. This control valve is connected through an output line 95 into the compartment 71 of the fluid pressure responsive selector valve means 60 and has open and closed positions selectively for opening and closing the pressurized control fluid in supply line 90 to the output line 95 and thus to the compartment 71.

Actuators 32 and 35 have their compartments 44 and 52 connected with the fluid pressure responsive selector valve means 60 through lines 96 and 98 which communicate with the interior of casing 61 and with exhaust outlets 101 and 102 in accordance with selected position of the movable valve member 67, as will be explained more fully hereinafter. Compartment 79 has a drain outlet 104 wherein a constriction 104a provides a small drain orifice while comparably, a drain outlet 103 from the compartment 80 has a constriction 103a wherein there is a small drain orifice. Bleed lines 97 and 99 are connected with the compartments 44 and 52 of the actuators 32 and 35 for these compartments to be in communication respectively with compartments 79 and 80 of the fluid pressure responsive selector valve means 60 regardless of position of the movable valve member 67. Bleed lines 97 and 99 in the present embodiment are tapped into the respective lines 96 and 98 and connect with the compartments 79 and 80 correspondingly to bleed fluid into these compartments continuously from lines 96 or 98 while valve 91 is open.

The centrifugal pumps 11 and 12 have their respective chambers and outlets 24 and 25 associated with first and second anti-backflow and drain valve means 105 and 120 for either or both of these pumps closed off against intake of fluid by either or both of the related on-off valves 31 and 34, to be closed against backflow, and for the chamber of either or both of the pumps closed on intake to be opened to drain to prevent churning of fluid in the chamber. In the latter arrangement, pumps 11 and 12 have their outlets 24 and 25 connected through flow discharge ducts 116 and 123 with anti-backflow valves 106 and 126, which in the present embodiment are fluid pressure responsive one-way check valves. Further, the chambers of pumps 11 and 12 are connected with fluid pressure responsive drain valves 107 and 121 through input lines 117 and 124 from the flow discharge ducts 116 and 123 and with vent lines 109 and 122 which are provided with orifices within constrictions 109a and 122a therein and lead from the input lines 117 and 124 back to the fuel supply duct 36 through anti-backflow or check valves 109b and 122b. The drain valves 107 and 121 have outlets 115 and 125 which are open to drain when the valves 107 and 121 are open and which are closed off from the input lines 117 and 124 when these same valves are closed.

Each of the drain valves 107 and 121 is position controlled by means of a biasing spring to be open to the related drain outlet but is closed by pressure of fluid being discharged from the associated centrifugal pump 11 or 12 as the case may be when the corresponding on-off valve 31 or 34 is open. The closed position of drain valve 107 is indicated in FIGURE 4. The valve includes a casing 112 within which a movable valve element 110 is disposed and seats upon an inside partition 112a of the casing. The partition has an opening 113 therein which communicates with the respective chambers 112b and 112c of the casing. A stem 110b of the valve member 110 extends through the partition opening 113 and joins the valve member plug 110a with the valve member foot 110c for the valve member to move axially between seated and unseated positions respectively to open and close the partition opening 113 with reference to the drain outlet 115 while having the foot 110c in chamber 112c and the plug in chamber 112a. A helical spring 114 comprehended compressionally between the valve member foot 110c and the opposite end wall of chamber 112c biases the valve member to open the chamber 112b to chamber 112c through the partition opening 113 and thus to open the chamber of the centrifugal pump 11 through the flow discharge line 116 and inlet line 117 to the drain outlet 115. Pressure of fluid discharged from the pump outlet 24 when the on-off valve 31 is open brings the anti-backflow valve 106 to open position and the drain valve 107 to its closed position. This prevails until the on-off valve 31 is closed, following which the anti-backflow valve 106 closes and fluid in the chamber of pump 11 encounters a pressure drop through vent line 109 and the drain valve 107 opens under the bias of spring 114 in response to this fall off in pressure and drains off fluid from the chamber of pump 11 to prevent churning. Drain valve 121 is similar to the drain valve 107 and therefore reliance is placed upon the foregoing description of structural details of valve 107 as being adequate to enable an understanding of the structure of valve 121. Pressure of fluid discharged from the pump outlet 25 when the on-off valve 34 is open brings the anti-backflow valve 126 to open position, enduring until the on-off valve 34 is closed. Following the latter event, the anti-backflow valve 126 closes and fluid in the chamber of pump 12 falls off through the vent line 122 and the drain valve 121 opens under the bias of its related spring for the chamber of pump 12 to drain fluid through the valve outlet 125 to prevent churning within the chamber of this pump.

The flow discharge output sides of the anti-backflow valves 106 and 126 are interconnected through a flow discharge header duct 127 having output from either of the centrifugal pumps 11 and 12 to a flow discharge duct 128 leading into the afterburner fuel control 135 of the jet engine 14. Control 135 has fuel output lines 137 and 138 connected respectively with low flow demand injector stage 27 and high flow demand injector stage 28 of a plural stage afterburner injector of the jet engine 14, and the control 135 is arranged having a lever 136 which is controlled by the pilot of the jet aircraft to select flow of fluid fuel from the duct 128 to the appropriate injector stage of the afterburner and thus for various flow demands to be imposed upon the supply of fuel from the supply duct 36.

System 10 is further characterized by having function generator means, presently embodying a constriction 131 having a throttling orifice constrictively in the flow discharge duct 128, so as to generate a pressure differential varying with the mass flow of fluid from either of the outlets 24 and 25 of the respective centrifugal pumps 11 and 12. Compartment 77 of the fluid pressure responsive selector valve means 60 is tapped into the flow discharge header 127 through tap line 129 in advance of the constriction 131, and compartment 78, on the opposite side of land 75 from the compartment 77, is tapped into the flow discharge duct 128 through tap line 130 immediately downstream in duct 128 from the constriction 131 for the kinetics of flow through the orifice in constriction 131 to produce a static pressure differential across the land 75 which varies as a function of flow of fuel then being injected into engine 14 from the multi-stage afterburner injector represented by stages 27 and 28.

Let it now be assumed that the rotors of the centrifugal pumps 11 and 12 are being driven through the gang connections 17, 18, 19 and 20 under operation of the compressor rotor 15 and turbine rotor 16, and that the jet engine 14 is being powered on fuel supplied from the main control 92 through line 93 to the main combustor 26. When the engine 14 is at an operating condition suitable for afterburner light off, this condition is for example automatically sensed in any suitable manner in the main fuel control 92 as a prerequisite to having a valve 91 automatically be opened through an appropriate link 94 suitably driven for the purpose when the pilot of the jet aircraft sets the pilot controlled lever 136 for opening the discharge duct 128 through the afterburner fuel control 135 to the multi-stage afterburner injector. However, if desired, the control valve 91 may be equipped to be manually operated between open and closed positions with or without automatic control. For the purpose of description which now is to ensue, let it be assumed that following readiness of the engine 14 for afterburner light off the afterburner fuel control 135 has been pilot controlled to connect the duct 128 with line 137 and thus to the low stage injector 27, and that the valve 91 is suitably maintained open, with the fluid pressure responsive selector valve means 60 being in the aforementioned first conductive position represented in FIGURE 1. Pressurized control fluid in the supply line 90 through having the control valve 91 set to the open position communicates through line 95, compartment 71 and line 96 with compartment 44 of the actuator 32 and maintains the piston 43 moved against the bias of spring 47 for the on-off valve 31 responding to the control fluid pressure to have open position. Meanwhile, compartment 52 of the actuator 35 communicates through duct 98 and compartment 80 with the exhaust outlet 103 and the on-off valve 34 is maintained in closed position by the biasing action of spring 55 upon piston 50 in the actuator 35. Pump 12, being closed off against intake from the fuel supply duct 36 by on-off valve 34 accordingly has the anti-backflow valve 126 closed and the drain valve 121 open to the drain outlet 125. Check valve 122b prevents fuel from entering pump 12 and also prevents draining of fuel, from duct 36, through valve 121.

Pump 11, though, in having the on-off valve 31 open, takes in fuel from the supply duct 36 and header 37, thence through this valve and duct 40 and discharges fuel through the anti-backflow valve 106, meanwhile having the drain valve 107 closed to the outlet 115. The output flow continues through header 127 and thence into duct 128, through the orifice in constriction 131 and to the afterburner control valve 135, and on through line 137 to discharge from the low stage injector 27. The relatively small discharge from the injector stage 27 represents low flow demand upon the system 10 and this low demand commensurately causes a relatively small drop in static pressure across the orifice in the constriction 131. The resulting differential in pressure across land 75 in the fluid pressure responsive selector valve means 60 is inadequate to cause any material change in position of the fluid pressure responsive selector valve means from that viewed in FIGURE 1. Change over of the fluid pressure responsive selector valve means 60, to a second conductive position indicated in FIGURE 2, is resisted by bias of spring 68 toward having the first conductive position and by the pressure in compartment 79.

When the output flow demand of fuel at the multi-stage afterburner injector means 27 and 28 reaches the upper limits of having these demands adequately satisfied by the centrifugal pump 11, the orifice in constriction 131 produces a pressure differential having an upper value across land 75 favoring movement of the movable valve member 67 against the bias of spring 68 and the pressure in compartment 79. The selector valve takes the second conductive position represented in FIGURE 2. This may be prompted for example by a reset of the pilot controlled lever 136 which brings into operation the high flow demand injection stage 28.

The shift-over from the first conductive position to the second conductive position by the fluid pressure responsive selector valve means 60 entails snap action. This action is prompted by reason of the fact that in the first conductive position of the fluid pressure responsive selector valve means 60 pressurized control fluid bleeds through the tap line 97 from line 96 into the compartment 79 and yieldably maintains the valve member or piston 67 in its first position as control fluid is metered off to exhaust through line 104 and the constrictive opening 104a provided in the constriction 104. This positioning action endures until pressure of fluid in compartment 77 produces a total force upon land 75 which exceeds it and the biasing force of spring 68, whereupon the fluid pressure responsive selector valve means takes the second conductive position wherein land 69 is positioned to connect line 96 through compartment 72 with the exhaust outlet 102 and the control fluid in the compartment 79 thus is free to exhaust through tap line 97 as well as through outlet 104. The remainder of the stroke of the movable valve member 67 is accomplished with a snap action, whereupon the fluid pressure responsive selector valve means 60 attains the second conductive position represented in FIGURE 2.

When piston 67 is so shifted, pressurized control fluid in line 95 passes through compartment 71 (see FIGURE 2) and thence communicates through line 98 with compartment 52 of the actuator 35, which actuator accordingly has its piston 50 move pressure responsively against the bias of spring 55 into a position where under the pressure of the control fluid the on-off valve 34 is maintained open. Meanwhile, control fluid in chamber 44 of the actuator 32 is relieved through line 96 by piston 43 moving under the bias of spring 47 and the on-off valve 31 takes closed position by having the fluid relieved progress through compartment 72 and exhaust through the exhaust outlet 102.

With the on-off valve 31 closed, the anti-backflow valve 106 closes, fluid bleeds off from the pump 11 through the discharge duct 116, line 117 and bleed line 109 and the drain valve 107 opens the chamber of this pump to the drain outlet 115. The centrifugal pump 12, with the on-off valve open has an intake of fuel from the supply duct 36, through header 37, and valve 34, and discharges through the discharge duct 123, thus opening the anti-backflow valve 126 and closing the drain valve 121. Flow discharge from the pump 12 continues from the anti-backflow valve 126 through the output flow header 127 and passes through duct 128 into the afterburner fuel control and through line 128 to the injector stage 28 or both stages as may be required for an increased supply. The respective pressures transmitted through lines 129 and 130 to the compartments 77 and 78, in view of the pressure drop through the orifice in constriction 131, introduce a pressure differential which is effective in the compartment 77 for maintaining the fluid pressure responsive selector valve means 60 in the aforementioned second conductive position. This pressure differential varies directly with the flow discharge demand imposed upon the centrifugal pump 12. System 10, however, includes a bypass valve 133 connected in parallel with the orifice in constriction 131 through an input line 132 from flow discharge duct 128 upstream from this orifice and through an output line 133 to the flow discharge duct 128 downstream from this orifice. The by-pass valve 133 is a fluid pressure responsive relief valve, the pressure response characteristics of which enable the valve to remain closed against by-passing fluid discharged from the centrifugal pump 12 until pressures within the range of operating pressures of pump 12 imposed on the input side of the orifice in constriction 131 approach being accompanied by excessive pressure drop, at which time the by-pass valve 133 opens fluid pressure responsively and both the valve and the orifice in constriction 131 share in passing relatively large flows from the pump 12 as occasion may demand.

Further, with reference to the fluid pressure responsive selector valve means 60 being in the aforementioned second conductive position and the valve 91 being open, control fluid continuously bleeds from line 98 through the tap line 99 into the compartment 80 and exercises a positioning effect in chamber 80 tending to maintain piston 67 in its second position, while control fluid in the continuous supply meters out through the drain line 103 and therefore through the aperture in constriction 103a.

When a diminishment of the mass output demand upon the system 10 occurs, such as on resetting the pilot controlled lever 136 for lower afterburner thrust, the decreased flow through the orifice in constriction 131 brings about a decrease in the differential in fluid pressure (across land 75) to a value appreciably less than that required for moving the fluid pressure responsive selector valve means 60 from the aforementioned first conductive position to the presently existing second conductive position. The biasing spring 68 acting against land 75 accordingly prevails over the positioning effect of control fluid in the compartment 80 and thrusts the piston 67 into a stroke bringing land 70 through a position wherein line 98 is connected through compartment 73 with the exhaust outlet 101 and the control fluid in compartment 80 is thus free to exhaust through tap line 99 as well as through outlet 103. There is surplus energy then in spring 68 for the remainder of the stroke of the movable valve member 67 to be accomplished with a snap action and the fluid pressure responsive selector valve means 60 accordingly is restored to the first conductive position represented in FIGURE 1.

The described, hydraulic snap action is also effective in preventing hunting or cycling operation of first one pump or the other. Thus it will be noted that switching from pump 11 to pump 12 occurs at a higher flow rate than switching in the opposite direction. Therefore, there is no critical flow rate which could cause cycling operation of the pumps due to small flow variations.

While a snap action is provided for the selector valve 60, it is important that there be no interruption in the delivery of fuel to the afterburner. Since a finite period is required for rated delivery of fuel from pumps 11 or 12 after valves 31 or 34 are opened, it is desirable that operation of these pumps overlap during switching. These ends are attained by providing an overtravel in the actuators 32, 33 so that the valves 31, 34 are opened at the start of actuator movement but are not closed until they have traveled a substantial distance as a result of venting lines 96, 98. Further, the controlled leakage of fuel through the bypass orifices 109a, 122a maintains a sufficient pressure at drain valves 107, 121 to prevent them from opening for a given time after the associated valves 31, 34 are closed. Where the pump outputs remain pressurized, fuel will continue to be delivered from the pump reservoir until the newly actuated pump reaches a pressure level sufficient to close the check valve 106 or 126, thus providing a smooth transition from one pump to the other without interrupting delivery of fuel.

It will also be seen that system 10 lends itself to having the control fluid valve 91 closed, such as while the engine 14 is driving the rotors of both of the centrifugal pumps 11 and 12 and is operating only on fuel supplied to the main combustor 26 from the main fuel control valve 92 through line 93. Under these conditions spring 68 position controls the movable valve member 67 for the fluid pressure responsive selector valve 60 to be in the first conductive position shown in FIGURE 1. In the latter position, compartment 44 of the actuator 35 (see FIGURE 3) is open through line 96 and the tap line 97 and accordingly through compartment 79 and drain outlet 104 for the on-off valve 31 to be position controlled closed by spring 47 with the valve 91 being closed. Compartment 52 of the actuator 35, being open through line 98 and compartment 73 to the exhaust outlet 101, enables the spring 55 in the actuator 35 to position control the on-off valve 34 to be closed. With both of the on-off valves 31 and 34 closed the anti-backflow valves 106 and 126 both close and the drain valves 107 and 121 both open for the chambers of the pumps to be open through the related drain valve outlets 115 and 125 to avoid churning of fluid in the chambers of the pumps.

Certain embodiments of the present invention which include snap action selection of the pump that is to deliver may employ mechanical detention instead of hydraulic snap action. Hysteresis built into the fluid pressure responsive selector valve means, as by the positioning action of the control fluid or through mechanical detention, is beneficial where the mass output flow demand upon the system varies in the region where change-over in pumps for satisfying the demand is in order. An example of mechanical detention for the purpose is represented by the mechanically latched fluid pressure responsive selector valve means 61' in FIGURES 5, 6, and 7. The latter valve means may be substituted for the fluid pressure responsive selector valve means 60 (FIGURE 1) though the fluid tap lines 97' and 99' feed off from the respective lines 96 and 98 through orifices in constrictions 97a and 99a to drain, and the movable valve member 67' is but a three land member within a casing 61' which supports a pair of pressure responsive latch members 150 and 151, for having these latch members engage keeper portions 70'a and 75'a of the lands 70' and 75' respectively in first and second positions of the fluid pressure responsive valve means 60'. The latch members 150 and 151 include balls 150a and 151a (see FIGURES 6 and 7) in bores 61'a and 61'b and the bores are constricted into the interior of the casing 61', so that the balls may project into this interior and yet have confinement to the bores. Springs 150b and 151b are compressed behind the corresponding balls in the bores 61a and 61b by means of plugs 150c and 151c which are threadedly engaged with the casing 61' inside these bores.

In the first conductive position of the fluid pressure responsive selector valve means 60', ball 151a engages forcefully in a declivity in the keeper portion 75'a of land 75' until pressure in the compartment 77', calling for change-over from the relatively low capacity pumps to the relatively high capacity pump as hereinbefore described with reference to FIGURES 1 to 4, prompts a retraction of ball 151a from the keeper portion 75'a whereupon the movable valve member 67' travels with a snap action against the bias of spring 68', bringing the fluid pressure responsive selector valve means 60' into the second conductive position, comparable to the second conductive position of the valve means 60 and the purpose hereinbefore described. As the second conductive position of the fluid pressure responsive selector valve means 60' is attained, ball 150a engages forcefully in a declivity in the keeper portion 70'a of land 70' and this engagement is maintained until pressure in the compartment 77' calls for change-over from the relatively high capacity pump to the relatively low capacity pump as hereinbefore described with reference to FIGURES 1 to 4. Spring 68' then acts to effect a retraction of ball 150a forcefully from the declivity in keeper portion 70'a, and the movable valve member 67' under the thrust of the spring 68' thereafter travels with a snap action until ball 151a again latches in the declivity in the keeper portion 75'a of the land 75'.

As the invention lends itself to many possible embodiments and as many possible changes may be made in the embodiments hereinbefore set forth, it will be distinctly understood that all matter described herein is to be interpreted as illustrative and not as a limitation.

I claim:

1. In a gas turbine engine having a rotor and an afterburner for augmenting a hot gas stream generated by the engine,
   a system for delivering fuel from a fuel supply to the afterburner comprising,
   a first centrifugal pump having a relatively small capacity,
   a second centrifugal pump having a relatively large capacity,
   said pumps being continuously driven from said engine rotor,
   means for connecting the outputs of both pumps to said afterburner,
   actuating means for selectively connecting only the inlet of said first pump to the fuel supply to provide low fuel flow to the afterburner, and
   means responsive to a relatively large fuel flow to the afterburner for selectively connecting only the inlet of said second pump to the fuel supply.

2. A fuel delivery system as in claim 1 wherein,
   check valves are respectively provided in the outlets of said pumps to prevent reverse flow of fuel therethrough.

3. A fuel delivery system as in claim 2 wherein,
   means are provided for automatically draining said pumps whenever their inlets are connected to said fuel supply.

4. A fuel delivery system as in claim 1 further including,
   normally closed valves respectively between the fuel supply and the pump inlets,
   actuators respectively associated with each inlet valve and responsive to a fluid signal to open its associated valve,
   a selector valve for directing a fluid pressure signal to the actuator of the first pump inlet valve upon the turbine rotor attaining a predetermined speed, said selector valve being responsive to a fluid pressure signal reflecting said large fuel flow to switch said pressure signal from said first inlet valve actuator to said second inlet valve actuator whereby the second pump supplies relatively large flows of fuel to said afterburner.

5. A fuel delivery system as in claim 4 wherein,
   check valves are respectively provided in the outlets of said pumps to prevent reverse flow of fuel therethrough, and
   means are provided for automatically draining said pumps whenever their inlets are not connected to said fuel supply.

6. A fuel delivery system as in claim 5 wherein,
   the means for automatically draining each of said pumps comprises a restricted bypass line from the output of said pump at a point upstream of said check valve to the inlet side thereof, and
   a drain valve between said restriction and said outlet at a point upstream of said check valve, said drain valve being yieldably urged open and closed upon pressurization of said outlet.

7. A fuel delivery system as in claim 5 wherein,
means are provided for substantially instanetaneously displacing said selector valve to switch said pressure signal from said first inlet valve actuator to said second inlet valve actuator.

8. A fuel delivery system as in claim 7 wherein,
the selector valve comprises,
a first chamber having an inlet connected to a fluid pressure source which is pressurized in response to the engine attaining said predetermined given speed, thereby providing said pressure signal,
a pair of outlets, on opposite sides of said inlet, respectively connected to said inlet valve actuators,
a selector valve piston having a pair of lands spaced apart approximately the distance of said outlet ports,
said piston having a first position in which the outlet port to the second actuator is blocked by one of said lands and the other of said lands is positioned to direct the pressure signal to said first inlet valve actuator,
an orifice through which fuel to the afterburner flows,
said selector valve comprising a second chamber,
said piston further including a land within said second chamber,
means respectively connected upstream and downstream of said flow orifice to said second chamber on opposite sides of the land therein and creating a pressure differential thereacross which urges said piston to a second position as flow to the afterburner increases,
said selector having a third chamber,
said piston having a land in said third chamber,
said third chamber having, on opposite sides of said land, inlet connections respectively to said actuators and orificed outlets whereby one side or the other of said third chamber is pressurized as the actuators are pressurized and a force is provided for resisting movement of the piston between its first and second positions so that a snap action is provided when a given pressure differential exists in the second chamber.

9. A fuel delivery system as in claim 8 wherein,
said selector valve piston, when in said second position, is responsive to a signal reflecting a smaller fuel flow than said large fuel flow signal to switch said pressure signal from said second inlet valve actuator to said first inlet valve actuator.

10. A fuel delivery system as in claim 9 wherein,
means are provided for maintaining an output from both pumps for a relatively short time as said signal is switched from one valve actuator to the other,
thereby maintaining an uninterrupted delivery of fuel from the system.

References Cited

UNITED STATES PATENTS

| | | |
|---|---|---|
| 2,617,361 | 11/1952 | Neal. |
| 2,781,727 | 2/1957 | Marshall et al. |
| 2,955,609 | 10/1960 | Gavbatz _____ 137—108 |
| 3,068,796 | 12/1962 | Pfluger et al. |
| 3,154,921 | 11/1964 | Junct et al. _____ 60—52 |
| 3,195,555 | 7/1965 | Schaub _____ 137—114 |

FREDERICK L. MATTESON, JR., *Primary Examiner.*

R. A. DUA, *Assistant Examiner.*

U.S. Cl. X.R.

103—11; 60—241; 340—41; 37—154